United States Patent [19]

Schmidt

[11] 3,884,725
[45] May 20, 1975

[54] BATTERY WITH POST-STRAP INSULATIVE CAP

[75] Inventor: Jacob E. Schmidt, Little Falls, N.J.

[73] Assignee: McGraw-Edison Company, Elgin, Ill.

[22] Filed: Feb. 15, 1974

[21] Appl. No.: 443,020

[52] U.S. Cl. .......... 136/134 R; 136/135 S; 136/166
[51] Int. Cl. .......................................... H01m 1/02
[58] Field of Search ........ 136/134 R, 166, 181, 163, 136/170, 135 S

[56] References Cited
UNITED STATES PATENTS

| | | | |
|---|---|---|---|
| 1,178,066 | 4/1916 | Gardiner | 136/170 |
| 1,982,801 | 12/1934 | Gerking | 136/181 |
| 2,724,012 | 11/1955 | Thompson | 136/166 |
| 3,769,095 | 10/1973 | Schmidt | 136/166 |

FOREIGN PATENTS OR APPLICATIONS

| | | | |
|---|---|---|---|
| 537,372 | 2/1957 | Canada | 136/135 R |

*Primary Examiner*—Donald L. Walton
*Attorney, Agent, or Firm*—George H. Fritzinger

[57] ABSTRACT

A battery comprising a row of individual cells each with positive and negative terminal posts and with connector straps between successive cells is provided with post-strap insulative caps which are pressed down in engagement with the post-strap connectors to provide protective sheaths against accidental shorting of one or more of the cells. In instances where it is desired to be able to make intermediate tap connections to the battery, a top wall section of one end portion of each cap is provided with a diaphragm thickness to enable it to be readily fractured and removed to provide access to the selected terminal post for a tap connector.

5 Claims, 8 Drawing Figures

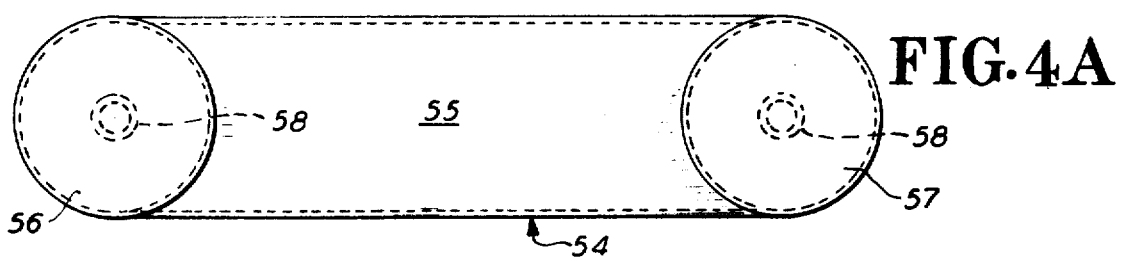
FIG. 4A
FIG. 4B
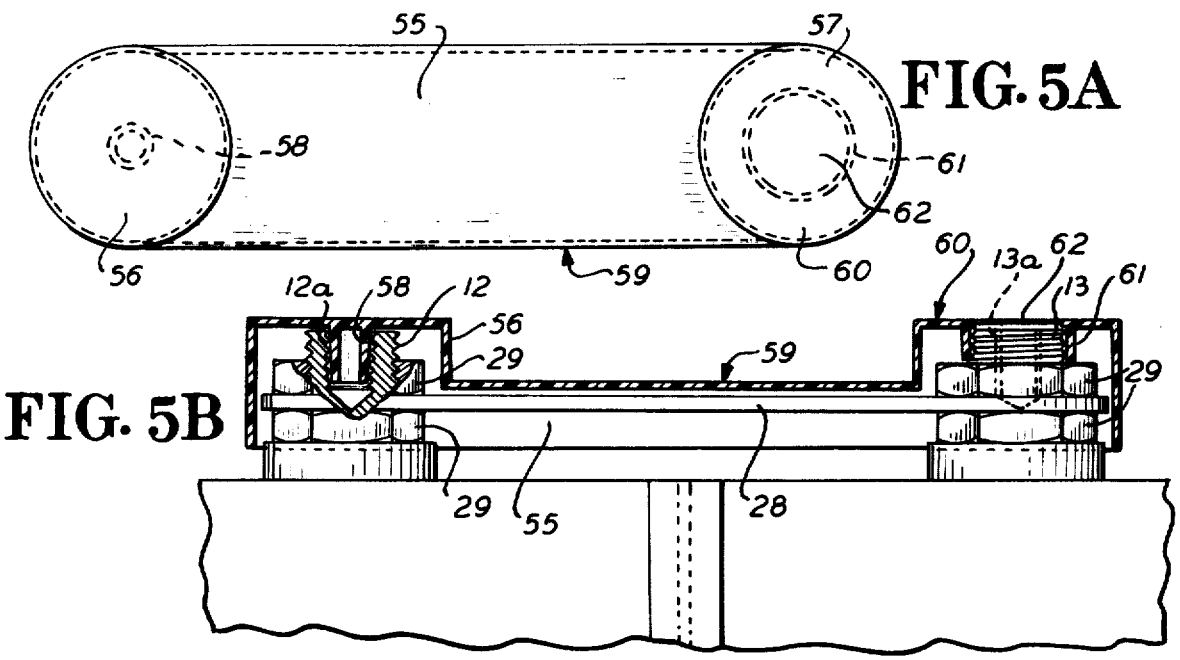
FIG. 5A
FIG. 5B
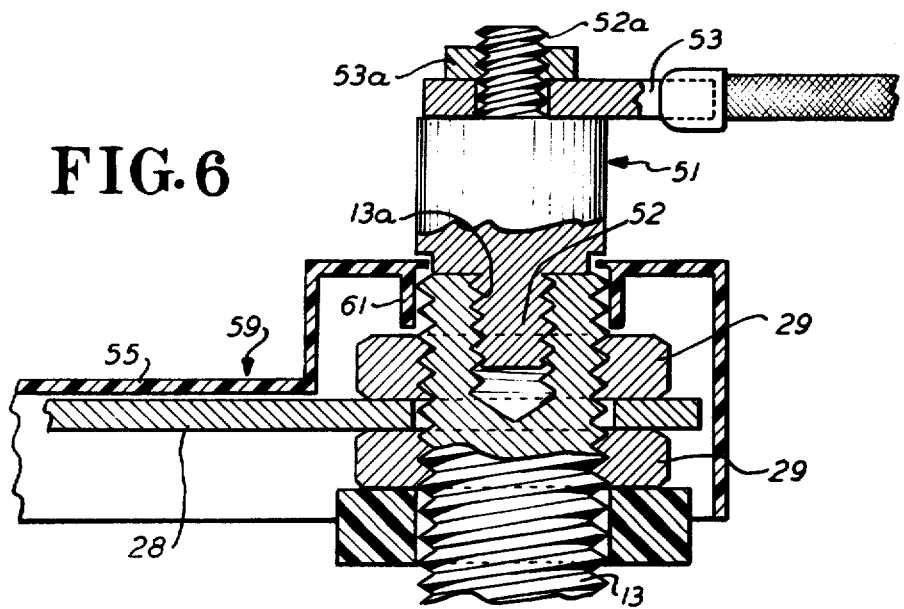
FIG. 6 ized by $3,884,725$.

BATTERY WITH POST-STRAP INSULATIVE CAP

An object of the invention is to provide a novel insulative cap for post-strap connectors between the cells of a battery, which is held in place by a press engagement of the cap with the post-strap connector.

Another object is to provide post-strap insulative caps for batteries having terminal posts with tapped center holes, wherein the caps have thin top-wall sections fracturable to provide access for threaded tap connections into the posts.

Another object is to retain the caps in place by engagement of internal elements of the caps with the internal and/or external threads of the terminal posts.

More particularly, it is an object to provide such insulative caps wherein at least one end is retained by press engagement of an internal stud of the cap with the tapped center hole of one of the terminal posts and the other end of the cap is retained also by such internal stud or by press engagement of an internal circular rib with the external threads of the other terminal post, and wherein the wall section within a rib is fracturable to expose the end of the terminal post for a threaded engagement with a tap connector.

These and other objects and features of the invention will be apparent from the following description and the appended claims.

In the description of the invention reference is had to the accompanying drawings, of which:

FIGS. 4a and 4b are plan and sectional views of a post-strap insulative cap of a preferred type wherein electrical tap connections are not needed;

FIGS. 5a and 5b are plan and sectional views of a post-strap insulative cap adapted at one end to permit a tap connector to be screw-threaded into the respective terminal post; and FIG. 6 is a sectional view of one end portion of an insulative cap, showing a tap connector in threaded engagement with the respective terminal post.

Figure 1:
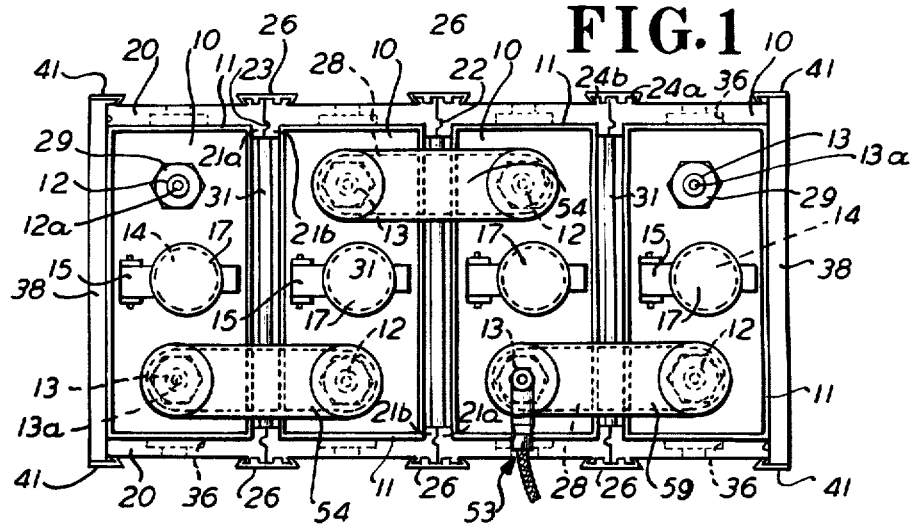
FIGS. 1 and 2 are plan and elevational views of a four-cell battery mounted in a unitary case construction wherein insulative caps are provided over the post-strap connectors and a tap connection is made to one of the intermediate terminal posts in accordance with the invention.
Figure 2:
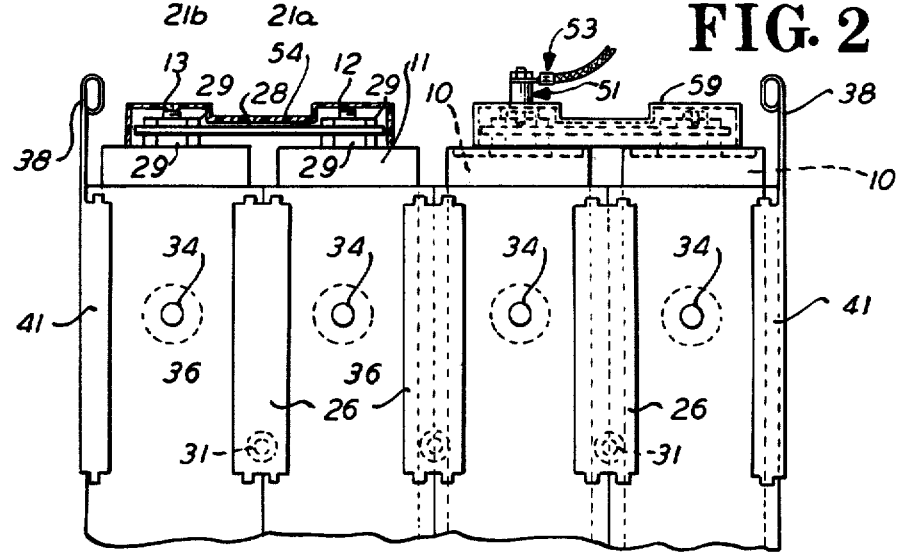

The present invention is herein illustrated in connection with a battery case construction of the type described in my U.S. Pat. No. 3,769,095 dated Oct. 30, 1973, but without intending any unnecessary limitation thereto. In this case construction each cell 10 has a rectangular metal container 11 with positive and negative terminal posts 12 and 13 extending through the top wall of the container and suitably insulated therefrom. In the top wall of each container there is also a plastic filler opening 14 from one side of which extends a radial arm 15 to which a metal filler cap 17 is hinged. The case construction is adapted to permit any number of cells to be mounted in a row with uniform spacing therebetween. This is accomplished by the use of plastic side-cover plates 20 each having vertically extending side flanges 21a and 21b extending inwardly at right angles to embrace the sides of a cell container. In the abutting faces of the side flanges 21a and 21b of successive side plates are respective interengaging ribs 22 and grooves 23. Also, on the outer walls of the side cover plates at the opposite sides thereof are vertical undercut edges 24a and 24b the adjacent ones of successive plates of which are bridged by clamps 26 to hold the side covers together. The side covers at opposite sides of the cells are also joined by rods 31 about midway the height of the cells. Also, in order to lock the side covers to the cell containers the opposite side walls of the containers are provided with short studs 34 which engage respective openings 36 in the side cover plates. At the ends of the battery there are metal plates comprising handle structures 38 having side flanges 41 which embrace the side cover plates and which engage the undercut edges 24a and 24b of the side plates to lock the handle structures to the case structure. For a more detailed description of the case structure, reference may be had to the aforementioned U.S. Pat. No. 3,769,095.

Figure 3:
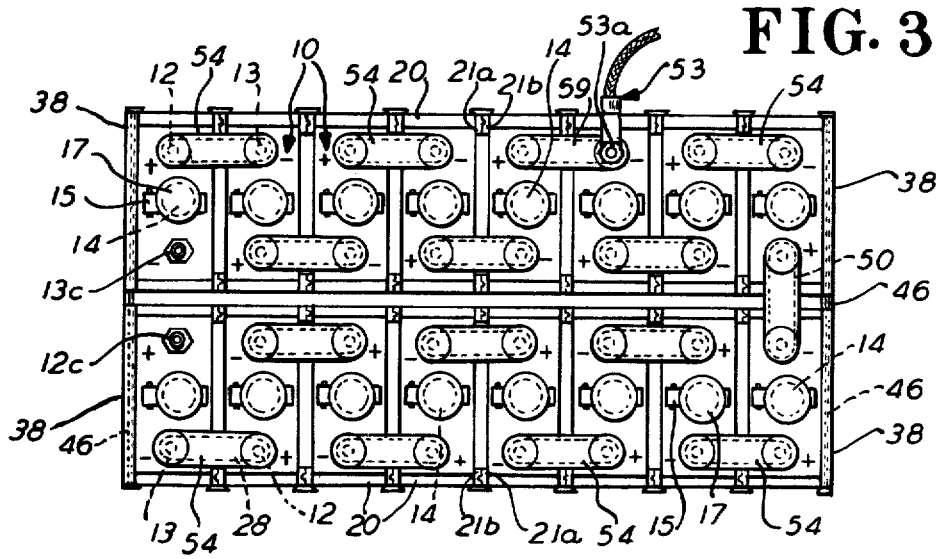
FIG. 3 is a plan view of a large bank of two rows of cells wherein each row is of the same case construction and the post-strap connectors are covered by insulative caps and wherein a tap connector is screw-threaded into one of the intermediate terminal posts.

Rows of cells of any desired number may be joined by the case structure abovedescribed, and successive rows may be joined at the ends into a large bank of cells by straps 46 connecting the handle structures as illustrated in FIG. 3. In each row the successive cells are connected serially by metal straps 28 secured firmly onto threaded end portions of the terminal posts by nuts 29. When a plurality of rows are employed forming a bank of cells, the endmost cells of each bank are connected by straps 50 similar to the straps 28 but of shorter length, leaving the first and last terminal posts 12c and 13c adjacent to each other at the first end of the bank as the terminal posts for the entire bank.

In an individual battery of only a few cells or in a large bank of cells there is need at times for tapping off the voltage from one or more of the intermediate cells. To permit such tap connections to be made the terminal posts are provided with tapped center holes 12a and 13a throughout their outer end portions. A tap connector is typically in the form of a metal rod 51 having a reduced diameter end portion 52 threaded for screw engagement with the tapped center hole of the terminal post until the shouldered end portion of the rod is tight against the end of the post. The rod 51 has also a reduced-diameter and threaded end portion 52a receiving a cable strap 53, which is secured tightly thereon by a nut 53a (FIG. 6).

In any battery employing a plurality of cells, whether of the usual single row cell structure as shown in FIG. 1 or of a multiple row of a bank of cells as shown in FIG. 3, it is desirable, especially when a large number of cells are employed, to safeguard against installation or maintenance men carelessly or accidentally placing a tool on the battery and providing it with a heavy short across part or all of the cells. This would produce a very excessive current drain with possible injury to personnel and with great damage to the battery. It is an object of the invention to prevent such accidental injury or damage by providing each post-strap connector of the battery with an insulative cap 54 which does not leave any portion of the post-strap connector exposed and available for such accidental shorting. In the present description, the term "post-strap connector" is used to include the metal strap 28 or 50, the upper threaded portion of the terminal posts 12 and 13 over which are fitted the apertured ends of the straps, and the nuts 29 which secure the straps to the posts.

The cap 54 comprises a central U-channel portion 55 overlying the strap 28 or 50 and cylindrical end portions 56 and 57 which envelop the terminal posts 12 or 13 and the nuts 29 threaded thereon. In applications where there is no need for making a tap connection between two cells of the battery, there is preferably employed an insulative cap 54 (FIGS. 4a and 4b) having the same connector grip at each end comprising an axially-positioned hollow stud 58 depending from the top wall of each cylindrical end portion of the cap for press engagement with the tapped center hole 12a or 13a of the respective terminal post as the cap is pressed downwardly onto the post-strap connector. Preferably, the studs are tapered as shown in FIG. 4b so that they will have tighter engagement with the tapped center hole as the cap is pressed more firmly onto the post-strap connector.

On the other hand, when it is desirable to make an intermediate tap connection to a cell of a battery, an insulative cap 59 is employed (FIGS. 5a and 5b) wherein at least one cylindrical end portion 60 thereof has a grip with the post-strap connector by an internal circular rib 61 depending from the top wall thereof which engages the external threads on the upper part of the terminal post as the cap is pressed down onto the post-strap connector. The central portion 62 of the top wall of the cap (FIG. 5b) within the circular rib is then provided with a diaphragm thickness so that it can be readily punctured or fractured and removed to expose the end of the terminal post. Having punctured and removed this central upper portion of the cap, a tap connector 51 is then threaded into the post cap as before described. Since only one tap connection would ever be made to a post-strap connector, because both posts of such connector are at the same polarity, the other end of the insulative cap 59 need not have a grip of a circular rib with the external threads of the other terminal post but instead may have a depending stud 58, as in the embodiment of FIGS. 4a and 4b, for a press engagement with the center hole of the other terminal post as is shown in FIGS. 5a and 5b. The invention comprehends, however, in its broader aspects, a friction or snap-on engagement with any portion of the post-strap connector — that is, with the upper portion of the terminal post, the nut 19 threaded on the terminal post, or any intermediate or end portion of the interconnecting strap 28 or 50.

The embodiments of my invention herein particularly shown and described are intended to be illustrative and not necessarily limitative of my invention, since the same are subject to changes and modifications without departure from the scope of my invention, which I endeavor to express according to the following claims.

I claim:

1. A battery comprising a plurality of individual cells having cases permitting the cells to be set side-by-side in rows and having upright terminal posts of positive and negative polarity, each with threaded end portions, said cells being arranged with the terminal post of one polarity of one cell adjacent to a terminal post of the opposite polarity of the next cell, post connectors between successive cells each comprising upper portions of a pair of said adjacent posts and a metal strap having apertured end portions fitted on said upper portions, nuts threaded on said posts to secure said straps thereto, and an insulative cap for each of said post connectors having a channel-shaped central portion covering said metal strap and having hollow end portions covering the respective terminal posts connected to said strap, each of said hollow end portions of each of said caps having internal elements releasably engaging the respective terminal posts to hold the cap in place over a post connector in response to pressing the cap thereon.

2. The battery set forth in claim 1 wherein said terminal posts have threaded center holes and said cap has an internal stud depending from the top wall thereof for engaging a center hole of a respective terminal post to retain the cap thereon.

3. The battery set forth in claim 2 wherein said stud is tapered to engage said threaded center hole with increasing interlocking engagement as the cap is pressed deeper onto said post connector.

4. The battery set forth in claim 2 wherein one end portion of said cap has a circular internal rib on the top wall thereof and depending therefrom for engaging the external threads of a respective terminal post, and wherein the top wall of said end portion within said circular rib has a diaphragm thickness permitting the wall to be readily fractured to enable a threaded tap connection to be made into the center hole of the respective terminal post.

5. The battery set forth in claim 1 wherein said terminal posts have threaded center holes and said end portions of said cap are cylindrically shaped and one end portion has a depending tapered stud for engaging the threaded center hole of one terminal post of the battery and the other end portion has a depending circular rib for engaging the exterior threads of the upper end portion of the next adjacent post both in response to pressing the cap downwardly onto the post connector, and wherein the top wall of said other cylindrical end portion within said circular rib has a diaphragm thickness permitting the same to be fractured to provide access for a screw-thread engagement of a connector tap into the center hole of the respective terminal post.

* * * * *